US012637066B2

(12) United States Patent
Sung et al.

(10) Patent No.: US 12,637,066 B2
(45) Date of Patent: May 26, 2026

(54) VEHICLE AND CONTROL METHOD CONSIDERING RISK OF VEHICLE

(71) Applicants: Hyundai Motor Company, Seoul (KR); Kia Corporation, Seoul (KR)

(72) Inventors: Dong Hyun Sung, Whasung-Si (KR); Jong Chul Kim, Whasung-Si (KR); Sangmin Lee, Whasung-Si (KR); Tae-Geun An, Whasung-Si (KR); Eungseo Kim, Whasung-Si (KR); Yongseok Kwon, Whasung-Si (KR)

(73) Assignees: Hyundai Motor Company;, Seoul (KR); Kia Corporation, Seoul (KR)

( * ) Notice: Subject to any disclaimer, the term of this patent is extended or adjusted under 35 U.S.C. 154(b) by 461 days.

(21) Appl. No.: 17/545,183

(22) Filed: Dec. 8, 2021

(65) Prior Publication Data
US 2022/0281443 A1 Sep. 8, 2022

(30) Foreign Application Priority Data
Mar. 3, 2021 (KR) ........................ 10-2021-0027947

(51) Int. Cl.
B60W 30/09 (2012.01)
B60W 10/18 (2012.01)
(Continued)

(52) U.S. Cl.
CPC ............ B60W 30/09 (2013.01); B60W 10/18 (2013.01); B60W 10/20 (2013.01);
(Continued)

(58) Field of Classification Search
CPC ...... B60W 10/18; B60W 10/20; B60W 30/09; B60W 30/0953; B60W 40/08;
(Continued)

(56) References Cited

U.S. PATENT DOCUMENTS

2003/0149545 A1* 8/2003 Shu ................... B60R 21/01542
702/182
2005/0030184 A1* 2/2005 Victor .................... B60K 28/06
340/576
(Continued)

FOREIGN PATENT DOCUMENTS

CN 111516698 A * 8/2020 ............... B60Q 1/46
CN 112036314 A * 12/2020 ......... G06K 9/00718
(Continued)

OTHER PUBLICATIONS

Ekandem, J. I. A. (2014). Ambient hues and audible cues an approach to automotive user interface design using multi-modal feedback (Order No. 10185411). Available from ProQuest Dissertations & Theses Global. (1918049903). (Year: 2014).*
(Continued)

*Primary Examiner* — Helal A Algahaim
*Assistant Examiner* — Leah N Miller
(74) *Attorney, Agent, or Firm* — MORGAN, LEWIS & BOCKIUS LLP

(57) ABSTRACT

A vehicle configured to perform collision avoidance control includes a steering device, a brake device, an output device, and a controller. When there is a risk of collision between the vehicle and an external object, the controller determines a dangerous state and a collision risk level according to signals received from an operating device being operated by a driver, determines a collision avoidance method, a collision avoidance time point, and a control amount for collision avoidance, based on at least one of the dangerous state and the collision risk level, and controls at least one of the steering device, the brake device, and the output device such that the vehicle performs collision avoidance control, based on the collision avoidance method, the collision avoidance
(Continued)

time point, and the control amount for the collision avoidance.

18 Claims, 8 Drawing Sheets

(51) Int. Cl.
| | |
|---|---|
| *B60W 10/20* | (2006.01) |
| *B60W 30/095* | (2012.01) |
| *B60W 40/08* | (2012.01) |
| *B60W 50/00* | (2006.01) |
| *B60W 50/08* | (2020.01) |

(52) U.S. Cl.
CPC ........ *B60W 30/0953* (2013.01); *B60W 40/08* (2013.01); *B60W 50/08* (2013.01); *B60W 2040/0818* (2013.01); *B60W 2050/0054* (2013.01); *B60W 2540/223* (2020.02); *B60W 2540/229* (2020.02)

(58) Field of Classification Search
CPC . B60W 2040/0818; B60W 2050/0054; B60W 50/08; B60W 2540/223; B60W 2540/229; B60W 2050/146; B60W 2540/12; B60W 50/0098; B60W 50/14; B60W 30/0956; B60W 2554/4026; B60W 2554/4029; B60W 2554/804; G05D 1/0061; G05D 1/0088; G05D 1/021; G05D 1/0214; G05D 1/0221; G05D 1/0223; B60K 28/00; B60K 28/02; B60K 28/06; B60K 28/14; G06F 3/04855; B60Y 2300/09
USPC ........................................................ 701/301
See application file for complete search history.

(56) References Cited

U.S. PATENT DOCUMENTS

| | | | |
|---|---|---|---|
| 2014/0142798 A1* | 5/2014 | Guarnizo Martinez | ..................... B60W 10/18 701/23 |
| 2018/0126901 A1* | 5/2018 | Levkova ............... | B60W 40/09 |
| 2018/0312164 A1* | 11/2018 | Sasabuchi ....... | B60W 30/18018 |
| 2019/0047588 A1* | 2/2019 | Yabuuchi ............. | G06V 20/597 |
| 2019/0241189 A1* | 8/2019 | Odate ................... | B60W 50/04 |

FOREIGN PATENT DOCUMENTS

| | | | | | |
|---|---|---|---|---|---|
| DE | 102018221121 A1 | * | 4/2020 | ............ | B60K 11/02 |
| JP | 2015205536 A | * | 11/2015 | | |
| JP | 2020117184 A | * | 8/2020 | | |
| KR | 10-2011-0097393 A | | 8/2011 | | |
| KR | 10-2018-0065585 A | | 6/2018 | | |
| KR | 10-2018-0066524 A | | 6/2018 | | |
| KR | 10-2019-0066114 A | | 6/2019 | | |
| KR | 20190066114 A | * | 6/2019 | ............ | B60W 30/08 |
| KR | 20190074471 A | * | 6/2019 | | |
| WO | WO-2022027894 A1 | * | 2/2022 | ............ | B60W 30/08 |

OTHER PUBLICATIONS

Kujala, T. Browsing the information highway while driving: three in-vehicle touch screen scrolling methods and driver distraction. Pers Ubiquit Comput 17, 815-823 (2013). https://doi.org/10.1007/s00779-012-0517-2 (Year: 2013).*
KR Office Action, dated Nov. 7, 2025.

* cited by examiner (a)                    (b)                    (c)

VEHICLE AND CONTROL METHOD CONSIDERING RISK OF VEHICLE

CROSS-REFERENCE TO RELATED APPLICATION

The present application claims priority to Korean Patent Application No. 10-2021-0027947, filed on Mar. 3, 2021, the entire contents of which is incorporated herein for all purposes by this reference.

BACKGROUND OF THE INVENTION

Field of the Invention

The present invention relates to a vehicle and a method for controlling the same, and more particularly to an advanced driver assistance system (ADAS).

Description of Related Art

An advanced driver assistance system (ADAS) may use various sensors (for example, a camera and a radar mounted to a vehicle) to determine the possibility of collision with a pedestrian or other vehicle based on signals output from the sensors, may automatically control a braking device or a steering device based on the determined possibility of collision, and may thus avoid a collision accident in advance.

A Forward Collision-Avoidance Assist (FCA) system from among the ADAS may warn a driver of the risk of collision with a front obstacle during vehicle driving, and may thus forcibly control braking or steering of the vehicle to avoid collision with the front obstacle.

The ADAS may be a system that operates in response to a collision risk detected in a forward region of a vehicle by utilizing front sensors (e.g., a camera, a radar, etc.), so that the ADAS can determine a time point where collision avoidance control will be performed, a method for controlling collision avoidance, and the amount of collision avoidance control by referring to driver state information indicating the driver who is looking forward or by referring to common-sense crisis management ability of the driver. However, when the driver does not look forward or cannot properly cope with the crisis, the ADAS has difficulty in implementing sufficient collision avoidance performance.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a vehicle and a method for controlling the same, which can predict collision response ability of a driver based on functions of the vehicle being operated by the driver, and can determine a collision avoidance method according to the predicted collision response ability.

Additional aspects of the invention will be set forth in part in the description which follows, and in part, will be obvious from the description, or may be learned by practice of the invention.

In accordance with an aspect of the present invention, a vehicle configured to perform collision avoidance control may include a steering device, a brake device, an output device, and a controller. When there is a risk of collision between the vehicle and an external object, the controller may be configured to determine a dangerous state and a collision risk level according to signals received from an operating device being operated by a driver, may determine a collision avoidance method, a collision avoidance time point, and a control amount for collision avoidance, based on at least one of the dangerous state and the collision risk level, and may control at least one of the steering device, the brake device, and the output device so that the vehicle is configured to perform the collision avoidance control, according to the determined collision avoidance method, the determined collision avoidance time point, and the determined control amount for the collision avoidance.

The dangerous state may include at least one of a first state, in which guaranteeing a field of view (FOV) of the driver is impossible, a second state, in which operation of a steering wheel in the steering device by the driver is impossible, and a third state, in which depression of a brake pedal in the brake device by the driver is impossible.

The operating device may include at least one of a steering wheel, a gearshifting device, a rear-view mirror operating device, side-view mirrors, a window operating device, a User Setting Mode (USM) device, and a display device.

When the collision risk level is high, the controller may be configured to determine the collision avoidance time point to be any time point within a predetermined time period. When the collision risk level is high, the controller may be configured to determine the control amount for the collision avoidance to be greater than a predetermined control amount for the collision avoidance.

The controller may be configured to determine a distance between the driver and the operating device being operated by the driver.

When the distance between the driver and the operating device being operated by the driver is longer than a predetermined distance, the controller may be configured to determine that the collision risk level is high.

When the distance between the driver and the operating device being operated by the driver is shorter than a predetermined distance, the controller may be configured to determine that the collision risk level is low.

The controller may be configured to determine the collision risk level, according to a number of physical manipulation stages of the driver who is operating the operating device.

The controller may be configured to determine the collision risk level, according to a number of menus displayed on the operating device being operated by the driver, a method for selecting the menus, and presence or absence of a scroll bar displayed on the operating device.

The controller may be configured to determine positions of hands or feet of the driver according to signals received from the operating device being operated by the driver. The controller may be configured to determine the dangerous state and the collision risk level according to the determined positions of the hands or the feet of the driver.

In accordance with another aspect of the present invention, a method for controlling a vehicle configured to perform collision avoidance control may include, when there is a risk of collision between the vehicle and an external object, determining, by a controller, a dangerous state and a collision risk level according to signals received from an operating device being operated by a driver, determining a collision avoidance method, a collision avoidance time point, and a control amount for collision avoidance, based on at least one of the dangerous state and the collision risk level, and controlling, by the controller, at least one of a steering device, a brake device, and an output device so that the vehicle is configured to perform the collision avoidance control according to the determined collision avoidance method, the determined collision avoidance time point, and the determined control amount for the collision avoidance.

The dangerous state may include at least one of a first state, in which guaranteeing a field of view (FOV) of the driver is impossible, a second state, in which operation of a steering wheel in the steering device by the driver is impossible, and a third state, in which depression of a brake pedal in the brake device by the driver is impossible.

The operating device may include at least one of a steering wheel, a gearshifting device, a rear-view mirror operating device, side-view mirrors, a window operating device, a User Setting Mode (USM) device, and a display device.

The method may further include, when the controller concludes that the collision risk level is high, determining, by the controller, the collision avoidance time point to be a time point within a predetermined time period, and when the controller concludes that the collision risk level is high, determining, by the controller, the control amount for the collision avoidance to be greater than a predetermined control amount for the collision avoidance.

The method may further include determining, by the controller, a distance between the driver and the operating device being operated by the driver.

The method may further include, when the controller concludes that the distance between the driver and the operating device being operated by the driver is longer than a predetermined distance, determining, by the controller, that the collision risk level is high.

The method may further include, when the controller concludes that the distance between the driver and the operating device being operated by the driver is shorter than a predetermined distance, determining, by the controller, that the collision risk level is low.

The method may further include determining, by the controller, the collision risk level, according to a number of physical manipulation stages of the driver who is operating the operating device.

The method may further include determining, by the controller, the collision risk level, according to a number of menus displayed on the operating device being operated by the driver, a method for selecting the menus, and presence or absence of a scroll bar displayed on the operating device.

The method may further include determining, by the controller, positions of hands or feet of the driver according to signals received from the operating device being operated by the driver, and determining, by the controller, the dangerous state and the collision risk level according to the determined positions of the hands or the feet of the driver.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
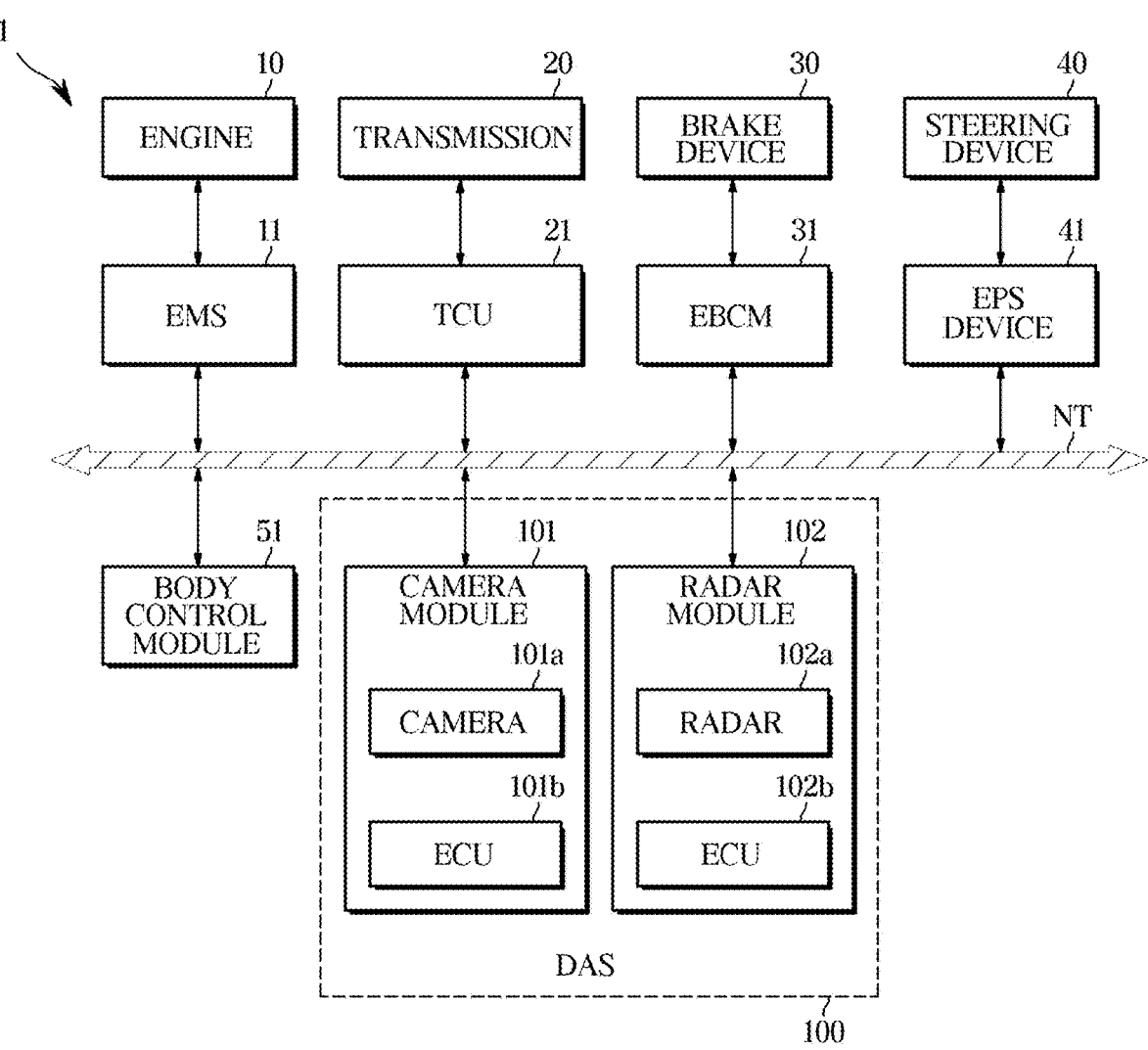
FIG. 1 is a block diagram illustrating an example of a vehicle according to various exemplary embodiments of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Throughout the specification of the present invention, terms ." . . . part", ".module", ." . . . member", ".block", and the like mean an element capable of being implemented by hardware, software, or a combination thereof. As used in the specification and appended claims, the term ".parts", ".modules", ".members", or ".blocks" may be implemented by a single constituent element, or the term ." . . . part", ".module", ." . . . member", or ".block" may include a plurality of constituent elements.

Throughout the specification of the present invention, if it is assumed that a certain part is connected (or coupled) to another part, the term "connection or coupling" means that the certain part is directly connected (or coupled) to another part and/or is indirectly connected (or coupled) to another part. Here, indirect connection (or indirect coupling) may conceptually include connection (or coupling) over a wireless communication network.

Throughout the specification of the present invention, if it is assumed that a certain part includes a certain component, the term "comprising or including" means that a corresponding component may further include other components unless context clearly indicates otherwise.

In description of the present invention, the terms "first" and "second" may be used to describe various components, but the components are not limited by the terms. These terms may be used to distinguish one component from another component.

The terms "a", "an", "one", "the" and other similar terms include both singular and plural forms, unless context clearly dictates otherwise.

Identification numbers for use in respective operations to be described later are used for convenience of description and better understanding of the present invention, do not describe the order or sequence of the respective operations of the present invention, and the respective operations of the present invention may be conducted in a different way from the order written in various exemplary embodiments of the present invention, unless context of each operation clearly indicates a specific order.

The principles of the present invention and the exemplary embodiments of the present invention will hereinafter be given with reference to the appended drawings. A vehicle and a method for controlling the same according to exemplary embodiments of the present invention will hereinafter be given with reference to the appended drawings.

Hereinafter, the principles and embodiments of the present invention will be described with reference to the accompanying drawings.

FIG. 1 is a block diagram illustrating an example of a vehicle according to various exemplary embodiments of the present invention.

Figure 2:
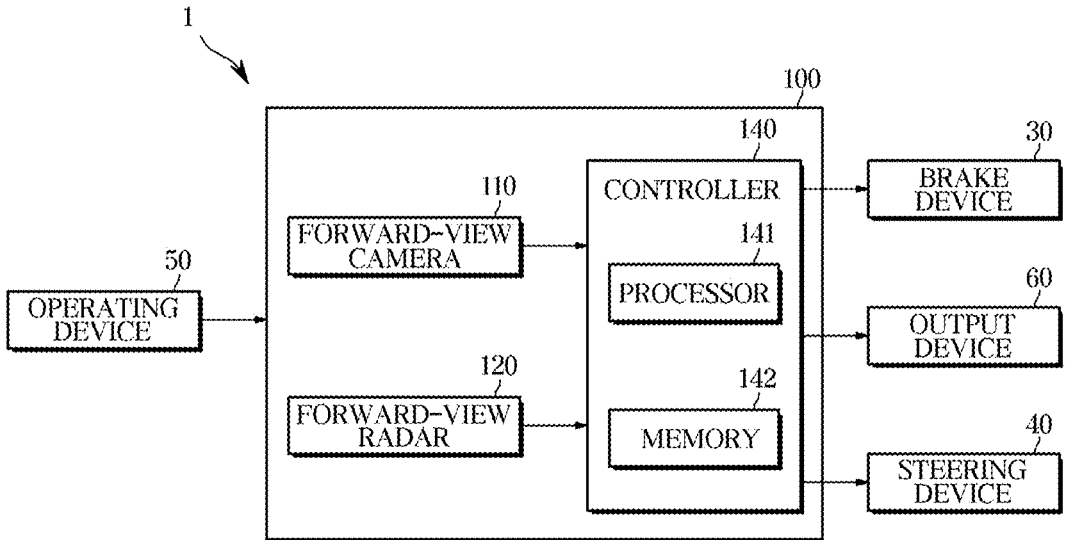
FIG. 2 is a control block diagram illustrating an example of a vehicle according to various exemplary embodiments of the present invention.

FIG. 2 is a control block diagram illustrating an example of a vehicle according to various exemplary embodiments of the present invention.

Figure 3:
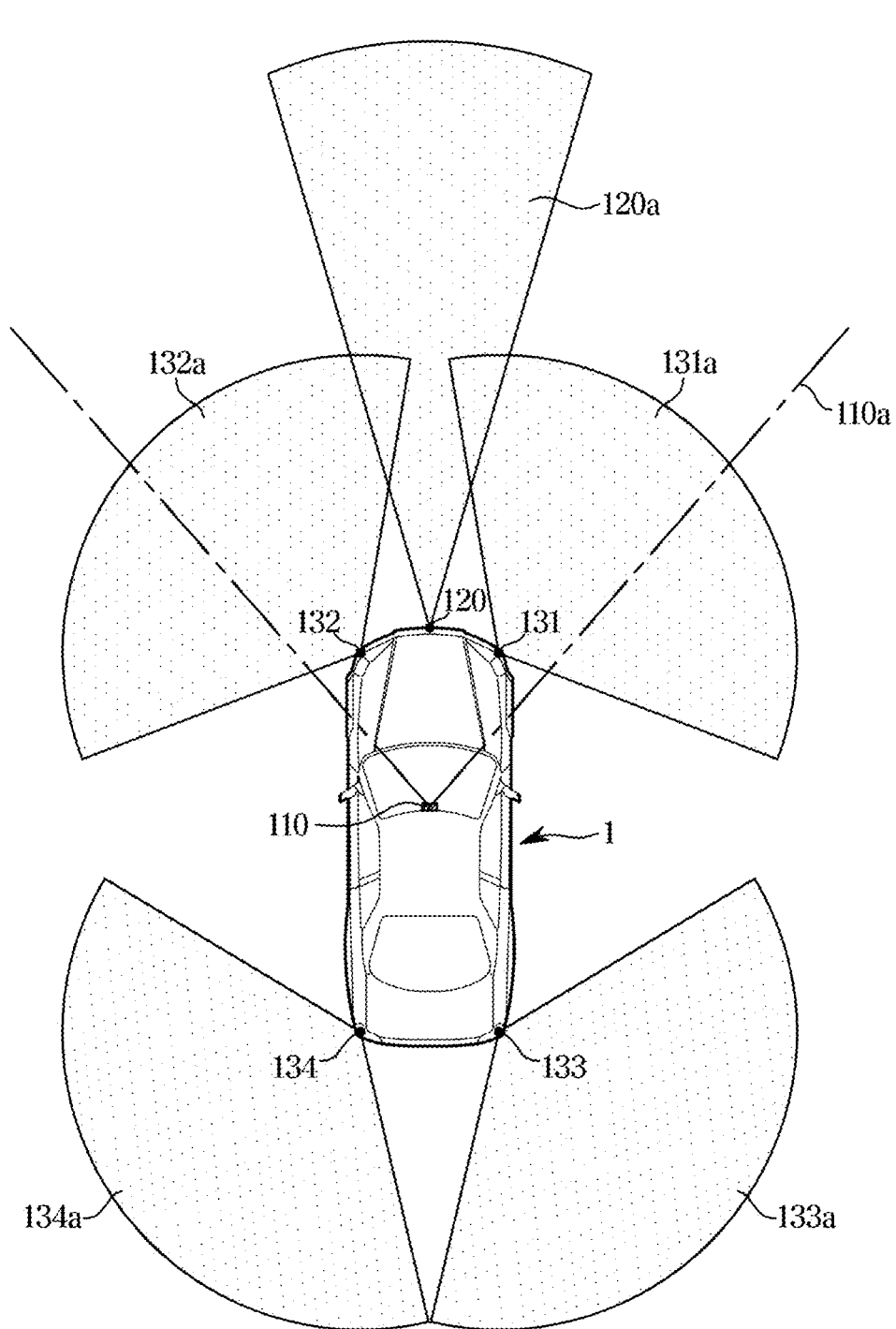
FIG. 3 is a conceptual diagram illustrating a camera and a radar included in the advanced driver assistance system (ADAS) according to various exemplary embodiments of the present invention.

FIG. 3 is a conceptual diagram illustrating a camera and a radar included in the advanced driver assistance system (ADAS) according to various exemplary embodiments of the present invention.

Figure 4:
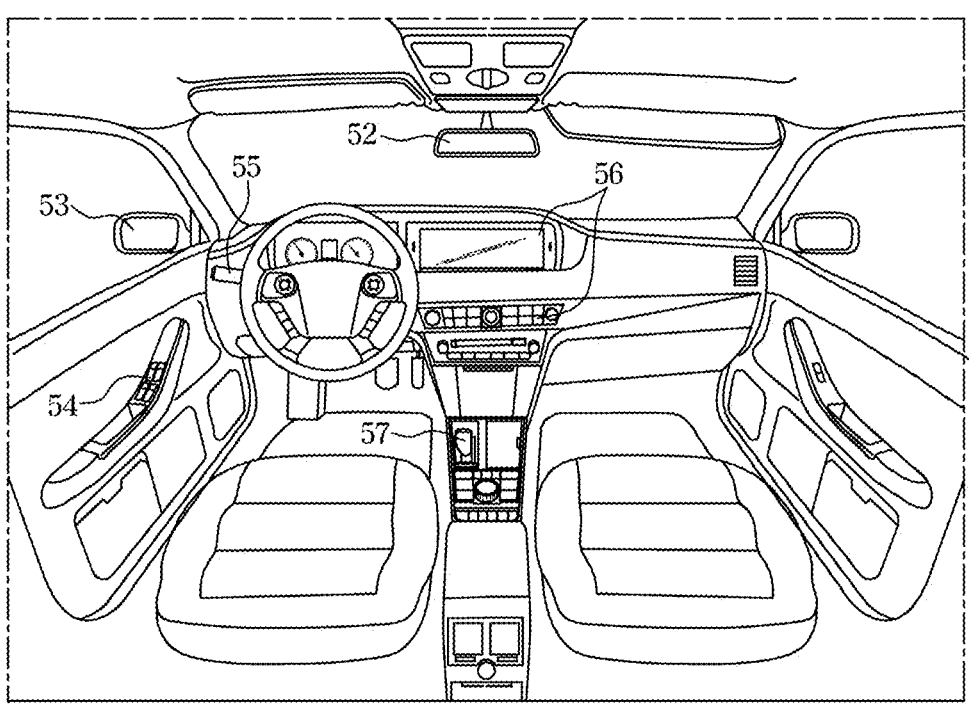
FIG. 4 is a schematic diagram illustrating an example of an operation device for the vehicle according to various exemplary embodiments of the present invention.

FIG. 4 is a schematic diagram illustrating an example of an operation device for the vehicle according to various exemplary embodiments of the present invention.

Referring to FIG. 1, the vehicle 1 may include an engine 10, a transmission 20, a brake device 30, and a steering device 40. The engine 10 may include at least one cylinder and at least one piston, and may generate power needed to drive the vehicle 1. The transmission 20 may include a plurality of gears, and may transmit power generated by the engine 10 to wheels of the vehicle 1. The brake device 30 may decelerate or stop the vehicle 1 through frictional force on wheels. The steering device 40 may change the traveling direction of the vehicle 1.

The vehicle 1 may include a plurality of electronic constituent elements. For example, the vehicle 1 may further include an Engine Management System (EMS) 11, a Transmission Control Unit (TCU) 21, an Electronic Brake Control Module (EBCM) 31, an Electronic Power Steering (EPS) device 41, a Body Control Module (BCM), and a Driver Assistance System (DAS).

The EMS 11 may control the engine 10 in response to either the driver's acceleration intention from the acceleration pedal or a request signal from a driver assistance system (DAS) 100. For example, the EMS 11 may control torque of the engine 10.

The TCU 21 may control the transmission 20 in response to either a driver's gearshifting command activated by a gearshifting lever and/or a driving speed of the vehicle 1.

For example, the TCU 21 may adjust or regulate a gearshifting ratio from the engine 10 to wheels.

The electronic brake control module (EBCM) 31 may control a brake device 30 in response to either the driver's brake intention from a brake pedal or slippage of wheels. For example, the EBCM 31 may temporarily release wheel braking in response to wheel slippage detected in a braking mode of the vehicle 1, resulting in implementation of an Anti-lock Braking System (ABS). The EBCM 31 may selectively release braking of wheels in response to over-steering and/or understeering detected in a steering mode of the vehicle 1, resulting in implementation of Electronic Stability Control (ESC). Furthermore, the EBCM 31 may temporarily brake wheels in response to wheel slippage detected by vehicle driving, resulting in implementation of a Traction Control System (TCS).

The electronic power steering (EPS) device 41 may assist the steering device 40 in response to the driver's steering intention from the steering wheel such that the EPS device 41 may assist the driver in easily handling the steering wheel. For example, the EPS device 41 may assist the steering wheel 40 such that steering force decreases in a low-speed driving mode or a parking mode of the vehicle 1 but increases in a high-speed driving mode of the vehicle 1.

A body control module 51 may control various electronic components that are configured for providing the driver with user convenience or guaranteeing driver safety. For example, the body control module 51 may control head-lamps (headlights), wipers, a cluster, a multifunctional switch, turn signal indicators, etc.

The driver assistance system (DAS) 100 may assist the driver in easily handling (e.g., driving, braking, and steering) the vehicle 1. For example, the DAS 100 may detect peripheral environments (e.g., a peripheral vehicle, pedestrian, cyclist, lane, traffic sign, etc.) of the vehicle 1 (i.e., host vehicle), and may perform driving, braking, and/or steering of the vehicle 1 in response to the detected peripheral environments.

The DAS 100 may provide the driver with various functions. For example, the DAS 100 may provide the driver with a Forward Collision Avoidance Assist (FCA) function, a Lane Departure Warning (LDW) function, a Lane Keeping Assist (LKA) function, a High Beam Assist (HBA) function, an Autonomous Emergency Braking (AEB) function, a Traffic Sign Recognition (TSR) function, a Smart Cruise Control (SCC) function, a Blind Spot Detection (BSD) function, etc.

The DAS 100 may include a camera module 101 to acquire image data of a peripheral region of the vehicle 1, and a radar module 102 to acquire data about a peripheral object present in the peripheral region of the vehicle 1. The camera module 101 may include a camera 101a and an Electronic Control Unit (ECU) 101b. The camera module 101 may capture an image about a forward region of the vehicle 1, and may recognize peripheral vehicles, pedestrians, cyclists, lanes, traffic signs, etc. The radar module 102 may include a radar 102a and a controller 102b, and may acquire a relative position, a relative speed, etc. of the peripheral object (e.g., a peripheral vehicle, a pedestrian, or a cyclist) of the vehicle 1.

The scope or spirit of the DAS 100 according to various exemplary embodiments of the present invention are not limited thereto, and the DAS 100 may further include a Light Detection And Ranging (LiDAR) sensor to detect the presence or absence of a peripheral object by monitoring (or scanning) the peripheral region of the vehicle 1.

The above-mentioned electronic components may communicate with each other through a vehicle communication network (NT). For example, the electronic components may perform data communication through Ethernet, Media Oriented Systems Transport (MOST), FlexRay, a Controller Area Network (CAN), a Local Interconnect Network (LIN), etc. For example, the DAS 100 may respectively transmit a drive control signal, a brake signal, and a steering signal to the EMS 11, the EBCM 31, and the EPS device 41 over the vehicle communication network (NT).

Referring to FIG. 2, the vehicle 1 may include a brake device 30, a steering device 40, an output device 60, and a driver assistance system (DAS) 100.

As described above, the vehicle 1 may perform collision avoidance control based on the position and relative speed of a peripheral object using the DAS 100 designed to perform FCA (Forward Collision Avoidance Assist). Here, the peripheral object may refer to another vehicle, a pedestrian, a cyclist, etc., and may further refer to all objects, each of which should be prevented from colliding with the traveling vehicle 1.

The DAS 100 may include a forward-view camera 110, a forward-view radar 120, and a plurality of corner radars. The forward-view camera 110, the forward-view radar 120, and the corner radars may be sensors for sensing an object located outside the vehicle 1, which will hereinafter be collectively referred to as a sensing unit for convenience of description.

The sensing unit may detect the presence or absence of an object, may obtain data about the object (hereinafter referred to as object data), and may provide the controller 140 with the object data. In the instant case, the object data may include image data obtained from the forward-view camera 110, and radar data obtained from the forward-view radar 120 and/or the corner radars.

The forward-view camera 110 may include a Field of View (FOV) 110*a* oriented to the forward region of the vehicle 1, as shown in FIG. 3. The forward-view camera 110 may be provided at a windshield of the vehicle 1.

The forward-view camera 110 may capture an image of the forward region of the vehicle 1, and may acquire data of the forward-view image of the vehicle 1. The forward-view image data of the vehicle 1 may include information related to the position of a peripheral vehicle, a pedestrian, a cyclist, or a lane located in the forward region of the vehicle 1.

The forward-view camera 110 may include a plurality of lenses and a plurality of image sensors. Each image sensor may include a plurality of photodiodes to convert light into electrical signals, and the photodiodes may be arranged in a two-dimensional (2D) matrix.

The forward-view camera 110 may be electrically coupled to the controller 140. For example, the forward-view camera 110 may be connected to the controller 140 through a vehicle communication network (NT), Hardwires, or a Printed Circuit Board (PCB).

The forward-view camera 110 may transmit the forward-view image data of the vehicle 1 to the controller 140.

The forward-view radar 120 may include a Field of Sensing (FOS) 120*a* oriented to the forward region of the vehicle 1 as shown in FIG. 3. The forward-view radar 120 may be mounted to, for example, a grille or a bumper of the vehicle 1.

The forward-view radar 120 may include a transmission (Tx) antenna (or a transmission (Tx) antenna array) to emit transmission (Tx) waves to the forward region of the vehicle 1 and a reception (Rx) antenna (or a reception (Rx) antenna array) to receive waves reflected from the object. The forward-view radar 120 may acquire forward-view radar data not only from Tx waves received from the Tx antenna, but also from reflected waves received from the Rx antenna. The forward-view radar data may include not only information related to a distance between the host vehicle 1 and a peripheral vehicle (or a pedestrian or cyclist) located in the forward region of the host vehicle 1, but also information related to a speed of the peripheral vehicle, the pedestrian or the cyclist. The forward-view radar 120 may determine a relative distance between the host vehicle 1 and any object based on a difference in phase (or difference in time) between Tx waves and reflected waves, and may determine a relative speed of the object based on a difference in frequency between the Tx waves and the reflected waves.

For example, the forward-view radar 120 may be coupled to the controller 140 through a vehicle communication network (NT), Hardwires, or a PCB. The forward-view radar 120 may transmit forward-view radar data to the controller 140.

The plurality of corner radars 130 may include a first corner radar 131 mounted to a forward right side of the vehicle 1, a second corner radar 132 mounted to a forward left side of the vehicle 1, a third corner radar 133 mounted to a rear right side of the vehicle 1, and a fourth corner radar 134 mounted to a rear left side of the vehicle 1.

The first corner radar 131 may include a field of sensing (FOS) 131*a* oriented to a forward right region of the vehicle 1, as shown in FIG. 3. For example, the forward-view radar 120 may be mounted to a right side of a front bumper of the vehicle 1. The second corner radar 132 may include an FOS 132*a* oriented to a forward left region of the vehicle 1, and may be mounted to, for example, a left side of the front bumper of the vehicle 1. The third corner radar 133 may include an FOS 133*a* oriented to a rear right region of the vehicle 1, and may be mounted to, for example, a right side of a rear bumper of the vehicle 1. The fourth corner radar 134 may include an FOS 134*a* oriented to a rear left region of the vehicle 1, and may be mounted to, for example, a left side of the rear bumper of the vehicle 1.

Each of the first, second, third, and fourth radars 131, 132, 133, and 134 may include a transmission (Tx) antenna and a reception (Rx) antenna. The first, second, third, and fourth corner radars 131, 132, 133, and 134 may respectively acquire first corner radar data, second corner radar data, third corner radar data, and fourth corner radar data. The first corner radar data may include information related to a distance between the host vehicle 1 and an object (e.g., a peripheral vehicle, a pedestrian, or a cyclist) present in a forward right region of the host vehicle 1, and information related to a speed of the object. The second corner radar data may include information related to a distance between the host vehicle 1 and an object (e.g., a peripheral vehicle, a pedestrian, or a cyclist) present in a forward left region of the host vehicle 1, and information related to a speed of the object. The third corner radar data may include information related to a distance between the host vehicle 1 and an object (e.g., a peripheral vehicle, a pedestrian, or a cyclist) present in a rear right region of the host vehicle 1, and information related to a speed of the object. The fourth corner radar data may include information related to a distance between the host vehicle 1 and an object (e.g., a peripheral vehicle, a pedestrian, or a cyclist) present in a rear left region of the host vehicle 1, and information related to a speed of the object.

Each of the first, second, third, and fourth corner radars 131, 132, 133, and 134 may be connected to the controller 140 through, for example, a vehicle communication network NT, Hardwires, or a PCB. The first, second, third, and fourth corner radars 131, 132, 133, and 134 may respectively transmit first corner radar data, second corner radar data, third corner radar data, and fourth corner radar data to the controller 140.

The controller 140 may include a controller (ECU) 101*b* (see FIG. 1) of the camera module 101 (see FIG. 1), a controller (ECU) 102*b* (see FIG. 2) of the radar module 102 (see FIG. 1), and/or an additional integrated controller.

The controller 140 may include a processor 141 and a memory 142.

The processor 141 may process forward-view image data of the forward-view camera 110, forward-view radar data of the forward-view radar 120, and corner radar data of the plurality of corner radars 130, and may generate a brake signal controlling the brake system 32 and a steering signal controlling the steering system 42. For example, the processor 141 may include an image processor to process forward-view image data of the forward-view camera 110, a digital signal processor to process radar data detected by the radars 120 and 130, and/or a Micro-Control Unit (MCU) to generate a brake signal and a steering signal.

The processor 141 may detect the presence or absence of a preceding object (e.g., a peripheral vehicle, a pedestrian, a cyclist, etc.) in the forward region of the vehicle 1 based on the forward-view image data of the forward-view camera 110 and the forward-view radar data of the forward-view radar 120.

In more detail, the processor 141 may acquire the position (distance and direction) of each preceding object of the vehicle 1 and information related to a relative speed of each preceding object. The processor 141 may acquire information related to the position (direction) and type (e.g., a peripheral vehicle, a pedestrian or a cyclist) of each preceding object of the vehicle 1 upon receiving the forward-view image data from the forward-view camera 110. Furthermore, the processor 141 may match the objects detected by the forward-view image data to objects detected by the forward-view radar data, respectively. The processor 141 may acquire information related to the type, position, and relative speed of each preceding object of the vehicle 1.

The processor 141 may generate a brake signal and a steering signal based on the type information of each preceding object and the relative speed of each preceding object.

For example, the processor 141 may determine a Time-to-Collision (TTC) between the vehicle 1 and the preceding object based on the position (distance) and relative speed of each preceding object, may compare the determined TTC with a predetermined reference time, and may warn the driver about a high possibility of collision with the preceding object or may transmit a brake signal to the brake system 32.

In another example, the processor 141 may determine a Distance-to-Collision (DTC) based on a relative speed of each preceding object, and may warn the driver about a high possibility of collision with the preceding object or may transmit a brake signal to the brake system 32 or transmit a steering signal to the steering system 42 according to the result of comparison between the determined DTC and the distance to each preceding object.

The processor 141 may acquire information related to the position and relative speed of each side object (e.g., a forward right object, a forward left object, a rear right object, or a rear left object) located in the side region of the vehicle 1 based on corner radar data received from the corner radars 130.

The processor 141 may transmit a steering signal to the steering system 42 based on the position (distance and direction) and relative speed of the side object of the vehicle 1.

For example, if there is a high possibility of collision between the host vehicle 1 and a preceding object based on the TTC or DTC parameter, the processor 141 may transmit a steering signal to the steering system 42 to avoid collision with the preceding object.

The processor 141 may determine whether the vehicle 1 can avoid collision with the preceding object by changing the traveling direction of the vehicle 1 to another lane based on the position (distance and direction) and relative speed of side objects of the vehicle 1. For example, if there is no side object of the vehicle 1, the processor 141 may transmit a steering signal to the steering system 42 to avoid collision with the preceding object. If the possibility of collision between the steered vehicle 1 and the side object is not high based on information related to the position (distance and direction) and relative speed of each side object, the processor 141 may transmit the steering signal to the steering system 42 to avoid collision with the preceding object. If there is a high possibility of collision with the steered vehicle 1 and the side object based on information related to the position (distance and direction) and relative speed of each side object, the processor 141 may not transmit the steering signal to the steering system 42.

If it is expected that the vehicle 1 will collide with an external obstacle or a peripheral vehicle, the controller 140 may determine whether the driver is handling the operating device 50 of the vehicle 1.

The controller 140 may determine a dangerous state and a collision risk level based on information received from the operating device 50 of the vehicle 1 driven by the driver. In other words, the dangerous state may refer to a state in which, as the driver manipulates the operating device 50 of the host vehicle 1 while simultaneously driving the host vehicle 1, driver concentration may decrease, so that there is a higher possibility of collision between the host vehicle 1 and another vehicle.

Referring to FIG. 4, the operating device 50 may include at least one of a steering wheel, a gearshifting device 57, a rear-view mirror (also called a room mirror) operating device 52, side-view mirrors 53, a window operating device 54, a wiper operating device 55, and a User Setting Mode (USM) 56, other implementations are also possible, and the operating device 50 may further include other operating devices present in the vehicle 1 as needed.

Furthermore, the operating device 50 may include various other operating devices 50 which may cause careless driving of the driver who drives the vehicle 1.

In more detail, when it is impossible to guarantee the field of view (FOV) of the driver who manipulates the operating device 50 of the vehicle 1, when the driver is unable to handle the steering wheel, or when the driver is unable to depress the brake pedal, the controller 140 may determine occurrence of the dangerous state in which there is a high possibility of collision with an obstacle or another vehicle.

The controller 140 may determine the distance between the driver and the operating device 50 handled by the driver.

If the distance between the driver and the operating device 50 of the vehicle 1 is longer than a predetermined distance, the controller 140 may determine a high collision risk.

If the distance between the driver and the operating device 50 of the vehicle 1 is shorter than the predetermined distance, the controller 140 may determine a low collision risk.

Based on the distance between a driver seat and the operating device 50, the controller 140 may determine that, as the distance between the driver seat and the operating device 50 becomes longer, the collision risk may also increase in proportion to the increasing distance.

The controller 140 may determine that, as the number of physical manipulation stages of the operating device 50 being operated by the driver increases, the collision risk is high.

If the operating device 50 being operated by the driver is set to the USM 56, the controller 140 may determine whether the risk of collision with another vehicle is high or low based on the number of displayed menus, a menu selection method, and the presence or absence of a scroll bar. In more detail, the controller 140 may determine occurrence of a high collision risk when many USM menus and various menu selection methods are present and a scroll bar is also present in the USM.

The controller 140 may determine the positions of hands or feet of the driver who handles the operating device 50, and may determine the collision risk based on the determined positions of hands or feet of the driver.

The controller 140 may divide the possibility of collision risk into a plurality of collision risk levels 0 to 3. As the collision risk decreases, the collision risk level may gradually approach zero '0'. As the collision risk increases, the collision risk level may gradually approach the value of 3.

For example, the controller 140 may allocate the collision risk level of 0 to each of the steering wheel and the gearshifting device designed to have functions related to vehicle driving. The controller 140 may allocate the collision risk level of 1 to the operating device 50 that less affects the driver of the vehicle 1 and is located relatively close to the driver while being handled by a simple manipulation method. Furthermore, the controller 140 may allocate the collision risk level of 2 to the operating device 50 that less affects the driver of the vehicle 1 and is located far from the driver. Furthermore, the controller 140 may allocate the collision risk level of 3 to the operating device 50 that greatly affects the driver of the vehicle 1 and is located farthest from the driver while being handled by a complicated manipulation method.

For example, the controller 140 may allocate the collision risk level of 1 to each of ON/OFF actions and easily-handled operating devices (e.g., the wiper operating device, the window opening/closing device, etc.) configured for being operated by easy action such as a pushing or pulling action of the driver. Here, the ON/OFF actions and each of the easily-handled operating devices may be activated or deactivated by only one action of the driver.

For example, the controller 140 may allocate the collision risk level of 2 to each of relatively long manipulation actions of the driver who handles the operating device 50. For example, the relatively long manipulation actions each having the collision risk level of 2 may correspond to a double-treated action of the driver, for example, a long-press action, an action for operating side-view mirrors, an action activated by physical force of the driver, an action for repeatedly controlling the opening/closing of windows.

For example, the controller 140 may allocate the collision risk level of 3 to each of the very long manipulation actions of the driver who handles the operating device 50. For example, the very long manipulation actions each having the collision risk level of 3 may correspond to an action that should be touched by the driver two or more times, for example, an action for operating sun-visors, an action for operating the rear-view mirror (room mirror), etc.

The controller 140 may determine whether the driver activates the USM.

When the driver activates the USM, the controller 140 may determine the number of menus to be transitioned from a currently-selected menu to the next stage. For example, the controller 140 may determine the number of menus to be selected in the next stage using a menu structure such as a tree structure including several menus. As the number of menus increases, the collision risk is determined to be high.

Furthermore, the controller 140 may determine complexity of each menu according to the menu structure such as a tree structure, may determine the probability of selecting the next-stage menu, and may determine the collision risk based on at least one of complexity of each menu and information related to whether the next-stage menu is selected.

To determine the complexity of each menu, the controller 140 may determine whether a menu to be selected by the driver is a check-box type, a scroll-bar type, or a word-input type. For example, if the menu to be selected is set to the check-box type, the controller 140 may allocate the collision risk level of 1 to the menu of the check-box type. If the menu to be selected is set to the scroll-bar type, the controller 140 may allocate the collision risk level of 2 to the menu of the scroll-bar type. If the menu to be selected is set to the work-input type, the controller 140 may allocate the collision risk level of 3 to the menu of the work-input type.

If there is a possibility of collision between the vehicle 1 and an external object, the controller 140 may determine whether the dangerous state of the driver is considered high or low to determine the collision avoidance method to be used.

In more detail, according to signals received from the operating device 50, the controller 140 may determine whether the driver can acquire the field of view (FOV), may determine whether the driver can operate the steering wheel, or may determine whether the driver can operate the brake pedal.

When the driver has difficulty in acquiring the field of view (FOV), the controller 140 may determine that there is a low possibility that the driver can recognize the collision risk, and may determine that the steering wheel and the brake pedal cannot be easily operated by the driver, so that the controller 140 may determine occurrence of a high collision risk.

When the driver has difficulty in operating the steering wheel, the controller 140 may determine that the driver can acquire the field of view (FOV) even if the driver's hands are not placed on the steering wheel, may determine that there is a possibility that the driver can recognize the collision risk based on the acquired FOV data, and may thus determine that the driver can easily depress the brake pedal based on the recognized collision risk. As a result, the controller 140 may determine that the recognized collision risk level is considered normal.

When the driver has difficulty in depressing the brake pedal, the controller 140 may automatically stop operation of the vehicle 1 within a predetermined speed range even when the driver who drives the vehicle 1 including an autonomous emergency braking (AEB) system does not directly depress the brake pedal, so that the controller 140 may determine that the collision risk is low in level.

Based on each of the dangerous state and the collision risk, the controller 140 may determine the collision avoidance method for avoiding collision between the host vehicle 1 and another vehicle, may determine a collision avoidance time where the vehicle 1 can avoid collision with another vehicle, and may determine the amount of collision avoidance control.

The controller 140 may control at least one of the steering device 40, the brake device 30, and the output device 60 based on at least one of the collision avoidance method, the collision avoidance time point, and the amount of collision avoidance control.

In more detail, when the controller 140 determines that the driver has difficulty in acquiring the field of view (FOV), there is a high possibility that the driver is unable to recognize the collision risk situation, so that the controller 140 may control the output device 60 to first output a message for collision avoidance warning and may then control the steering device 40 and the brake device 30.

In the instant case, the controller 140 may control a display unit to output a message for warning the driver of a high collision risk situation. Furthermore, the controller 140 may control a speaker to audibly warn the driver of the high collision risk situation. In the instant case, the warning message may be used to inform the driver of an appropriate collision risk method for collision avoidance, but is not limited thereto.

For example, if the collision risk level is set to 3 and is considered high, and if the driver has difficulty in operating the steering wheel, the controller 140 may rapidly control the warning output time point for outputting the warning message. Thereafter, even when the controller 140 also determines that the driver also has difficulty in operating the steering wheel, the controller 140 may control the brake device 30 to perform automatic braking of the autonomous emergency braking (AEB) system.

For example, if the collision risk level is set to 3 and is considered high, and if the driver has difficulty in depressing the brake pedal, the controller 140 can rapidly control the warning output time point for outputting the warning message. Thereafter, even when the controller 240 also determines that the driver also has difficulty in operating the brake pedal, the controller 140 may control the steering device 40 to perform automatic steering.

For example, when the driver manipulates the operating device 50 using only one hand, the controller 140 may determine that the driver has difficulty in easily controlling the steering wheel using the other hand, so that the controller 140 may increase the control amount of the steering wheel handled by the driver.

For example, when the controller 140 determines that the driver has difficulty in easily depressing the brake pedal, the controller 140 may increase the amount for controlling the brake pedal to be depressed by the driver, or may increase the amount for automatic braking control.

The memory 142 may store programs and/or data needed for the processor 141 to process image data, may store programs and/or data needed for the processor 141 to image radar data, and may store programs and/or data needed for the processor 141 to generate a brake signal and/or a steering signal.

The memory 142 may temporarily store image data received from the forward-view camera 110 and/or radar data received from the radars 120, and may also temporarily store the processed results of the image data and/or the radar data handled by the processor 141.

The memory 142 may include not only a volatile memory, such as a Static Random Access memory (SRAM) or a Dynamic Random Access Memory (DRAM), but also a non-volatile memory, such as a flash memory, a Read Only Memory (ROM), or an Erasable Programmable Read Only Memory (EPROM), The scope or spirit of the DAS 100 according to various exemplary embodiments of the present invention are not limited to FIG. 2, and the DAS 100 may further include a Light Detection And Ranging (LiDAR) sensor to detect the presence or absence of a peripheral object by monitoring (or scanning) the peripheral region of the vehicle 1.

Likewise, the controller 140 may transmit the brake signal to the brake system 32 based on information related to the high possibility of collision with the preceding object. If there is no side object or there is a low possibility of collision with the side object, the controller 140 may transmit the steering signal to the steering system 42 to avoid collision with the preceding object. If there is a high possibility of collision between the steered vehicle 1 and the side object, the controller 140 may not transmit the steering signal to the steering system 42.

Figure 5:
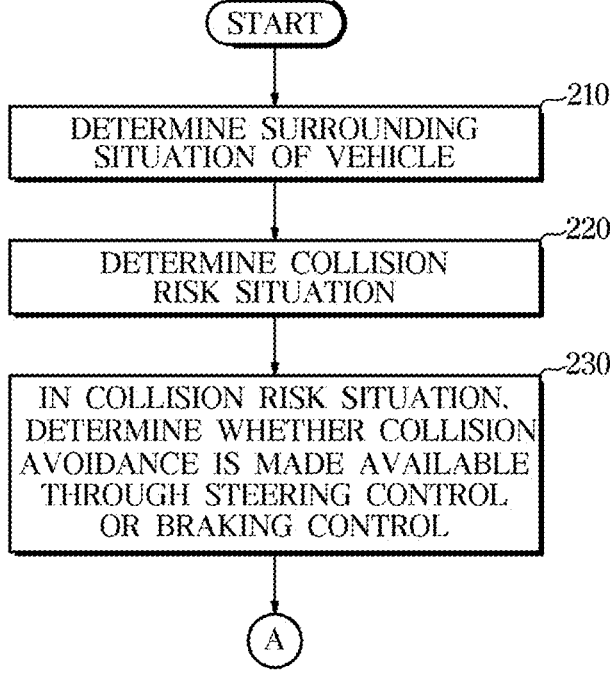
FIG. 5, FIG. 6 and FIG. 7 are flowcharts illustrating examples of a method for controlling a vehicle according to various exemplary embodiments of the present invention.
Figure 6:
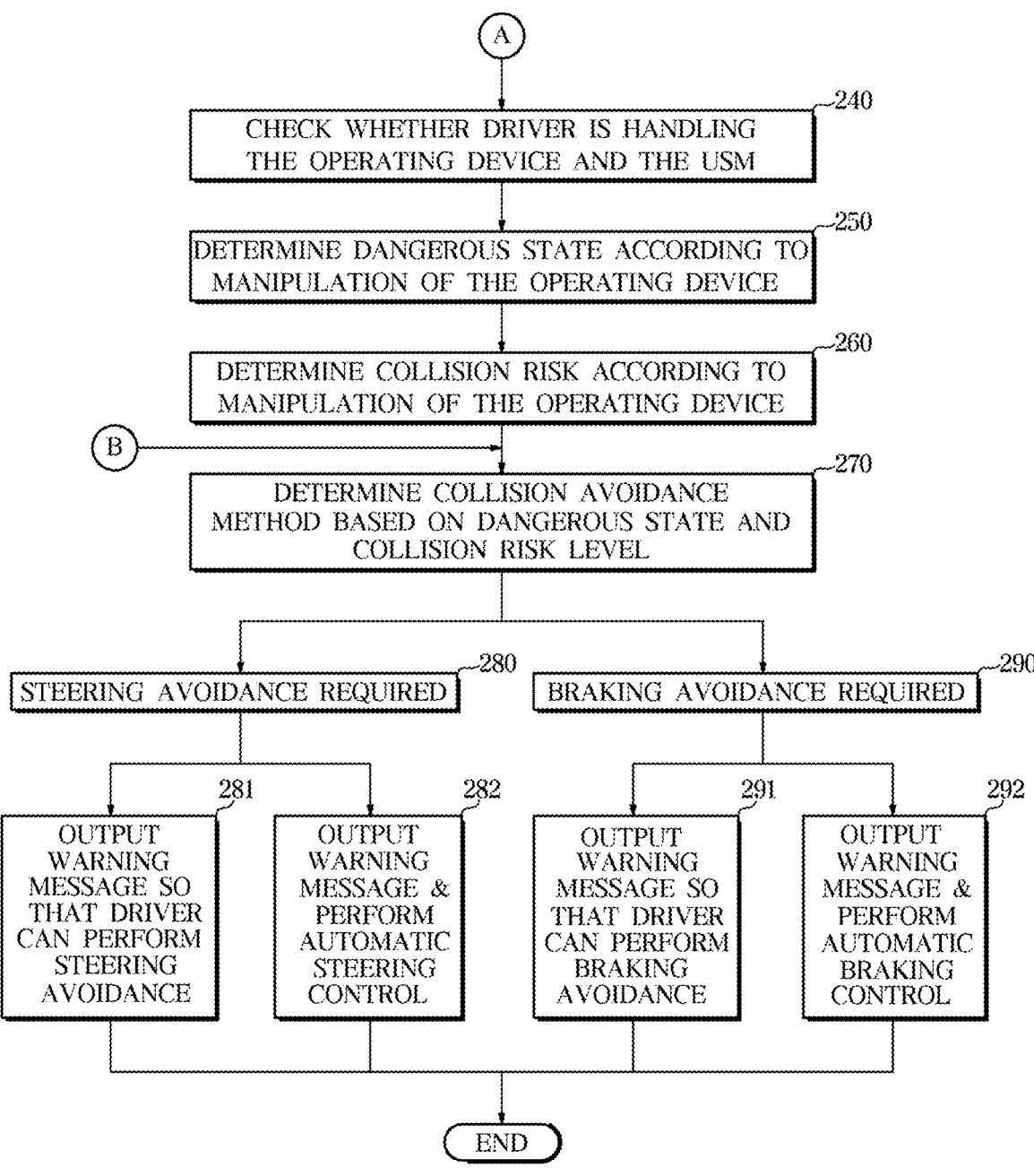
Figure 7:
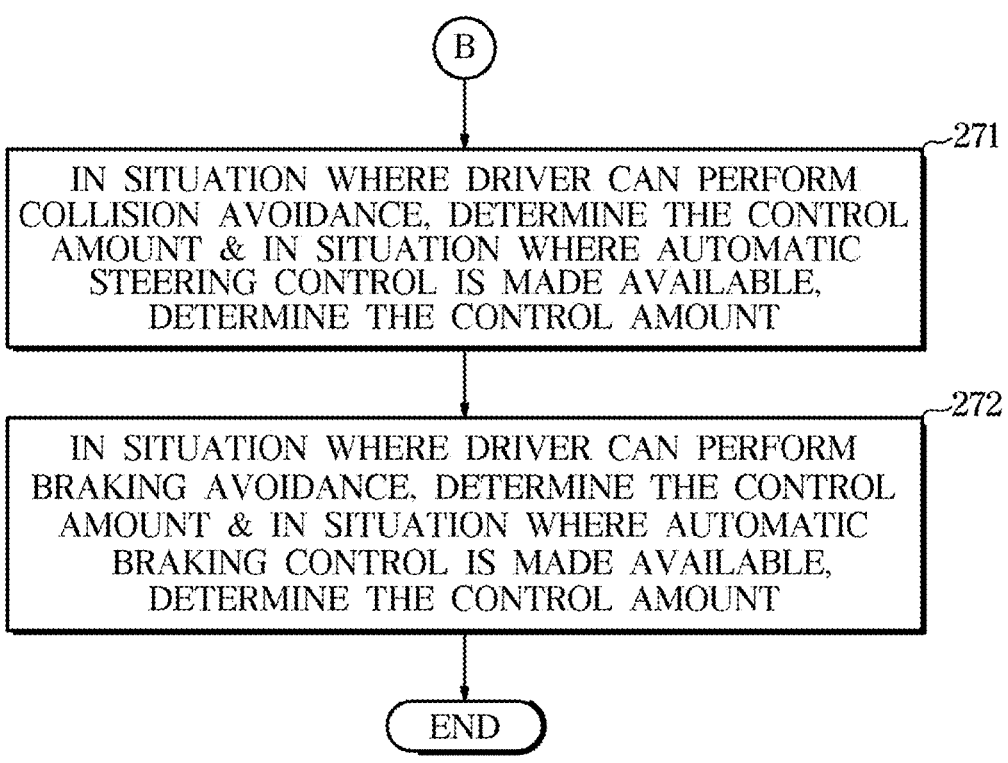

FIG. 5, FIG. 6 and FIG. 7 are flowcharts illustrating examples of a method for controlling the vehicle 1 according to various exemplary embodiments of the present invention.

Referring to FIG. 5, the vehicle 1 may determine the surrounding situation (Operation 210).

The vehicle 1 may determine the risk of collision with an external obstacle or another vehicle (Operation 220).

When there is a high possibility that the vehicle 1 will collide with an external obstacle or another vehicle, the vehicle 1 may determine whether the driver can perform steering control for the steering wheel. Furthermore, the vehicle 1 may determine whether the driver can perform braking control by depressing the brake pedal (Operation 230).

A method for facilitating the controller 140 to determine whether the driver can operate the steering wheel or can depress the brake pedal will hereinafter be described with reference to FIG. 6.

Referring to FIG. 6, the vehicle 1 may determine whether the driver is handling the operating device 50. In detail, the vehicle 1 may determine whether the driver is handling the USM (Operation 240).

To determine whether the driver is handling the operating device 50, the vehicle 1 may determine the operation state of the operating device 50 in real time.

When the vehicle 1 determines that the vehicle is handling the operating device 50, the vehicle 1 may determine the dangerous state or the collision risk according to signals received from the operating device 50 handled by the driver (Operation 250).

In more detail, when it is impossible to guarantee the field of view (FOV) of the driver who manipulates the operating device 50 of the vehicle 1, when the driver is unable to handle the steering wheel, or when the driver is unable to depress the brake pedal, the vehicle 1 may determine occurrence of the dangerous state in which there is a high possibility of collision with an obstacle or another vehicle.

When the vehicle 1 confirms that the driver is handling the operating device 50, the vehicle 1 may determine the collision risk level according to signals received from the operating device 50 handled by the driver (Operation 260).

In more detail, based on the distance between the driver seat and the operating device 50 handled by the driver, as the distance between the driver seat and the operating device 50 becomes longer, the collision risk level may be considered high. Furthermore, the controller 140 may determine that, as the number of physical manipulation stages of the operating device 50 being operated by the driver increases, the collision risk level may be considered high, and as the complexity of physical manipulation stages becomes higher, the collision risk may also be considered high.

For example, the vehicle 1 may determine that each of a long-pressing finger action required to operate the side-view mirror operating device, the action for applying physical force of the driver, and the operating device 50 to be continuously handled by the driver has a high collision risk.

For example, when the driver's action required to handle the operating device 50 is set to any one of an 'Opening' action, a 'Closing' action, a 'Pushing' action, and a 'Folding' action, the vehicle 1 may determine the collision risk level to be low. Furthermore, when the driver's action required to handle the operating device 50 is considered to be a simple manipulation action (for example, the action for ON/OFF operations, the action for operating the wiper operating device, and/or the action for operating the window opening/closing device), the vehicle 1 may determine the collision risk level to be low.

Figure 8:
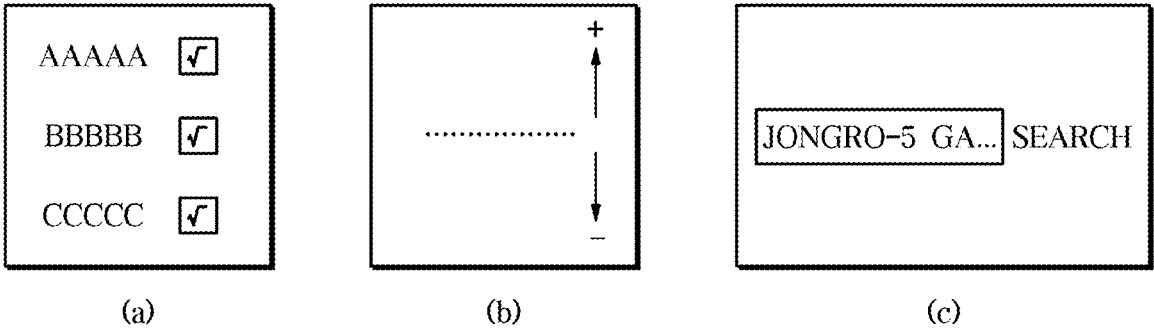
FIG. 8 is a conceptual diagram illustrating a method for determining whether the collision risk is high or low when the driver is handling the operation device according to various exemplary embodiments of the present invention.

When the driver is operating the USM, the vehicle 1 may determine whether the collision risk is high or low based on the number of displayed menus, a menu selection method, and the presence or absence of a scroll bar. For example, as shown in FIG. 8, when the displayed menu is a check-box type, the vehicle 1 may determine that the operating device 50 may be easily handled, so that the collision risk is determined to be low. Furthermore, when the displayed menu is a scroll-bar type, the vehicle 1 may determine the collision risk to be normal. When the displayed menu is a word-input type, there is a higher possibility of careless driving of the driver who drives the vehicle 1 because the driver may directly input necessary words to the operating device 50, so that the vehicle 1 may determine the collision risk to be high.

On the other hand, the vehicle 1 may numerically represent the collision risk as various collision risk levels. As the collision risk is low, the collision risk may be set to the collision risk level of 1. As the collision risk is normal, the collision risk may be set to the collision risk level of 2. As the collision risk is high, the collision risk may be set to the collision risk level of 3. If the driver handles the operating device 50 directly related to driving of the vehicle 1 in the same manner as in the steering wheel, the collision risk may be set to the collision risk level of 0.

Furthermore, the vehicle 1 may control the output device to output the collision risk represented as various numerical collision risk levels.

The vehicle 1 may determine how to avoid collision with an obstacle or another vehicle based on the dangerous state or the collision risk (Operation 270).

In the instant case, the vehicle 1 may check the operation state of the operating device 50 in real time. If the operating device 50 being operated by the driver is changed to another operating device, the vehicle 1 may change the dangerous state to another state and then update the collision risk level based on the changed state.

A method for determining collision avoidance will hereinafter be described with reference to FIG. 7. Referring to FIG. 7, based on the dangerous state and the collision risk, the vehicle 1 may determine the collision avoidance method, the collision avoidance time point, and the amount of collision avoidance control.

When the vehicle 1 determines that the driver can operate the steering wheel, the vehicle 1 may determine the amount of steering wheel control. When the driver has difficulty in operating the steering wheel, the vehicle 1 may decide to increase the amount of automatic steering control (Operation

271). For example, when the driver is operating the operating device 50 using his or her right hand, the driver has to operate the steering wheel using his or her left hand only, so that the vehicle 1 may determine that the driver has difficulty in safely and sufficiently operating the steering wheel using only one hand, and may thus decide to increase the amount of steering wheel control.

When the vehicle 1 determines that the driver can depress the brake pedal, the vehicle 1 may determine the amount of brake pedal control. If it is determined that the driver has difficulty in easily depressing the brake pedal, the vehicle 1 may decide to increase the amount of automatic braking control of the autonomous emergency braking (AEB) system (Operation 272).

When there is a collision risk, the vehicle 1 may determine whether steering avoidance of the vehicle 1 is required (Operation 280), or may determine whether braking avoidance of the vehicle 1 is required (Operation 290).

If steering avoidance of the vehicle 1 is required, and if the driver can operate the steering wheel based on the dangerous state and the collision risk, the vehicle 1 may output a warning message such that the driver can operate the steering wheel to perform steering avoidance (Operation 281).

Considering that the driver is unable to operate the steering wheel, the vehicle 1 may be kept in a backup mode for automatic steering control or automatic braking control.

When steering avoidance of the vehicle 1 is required, when the driver has difficulty in easily operating the steering wheel based on the dangerous state and the collision risk, the vehicle 1 can control the steering device 40 to perform automatic steering control (Operation 282).

When braking avoidance of the vehicle 1 is required, when the driver can depress the brake pedal based on the dangerous state and the collision risk, the vehicle 1 may output a warning message such that the driver can depress the brake pedal (Operation 291).

Considering that the driver is unable to depress the brake pedal, the vehicle 1 may be kept in a backup mode for automatic steering control or automatic braking control.

When braking avoidance of the vehicle 1 is required, when the driver has difficulty in easily depressing the brake pedal based on the dangerous state and the collision risk, the vehicle 1 may control the brake device 30 to perform automatic braking control (Operation 292).

Figure 9:
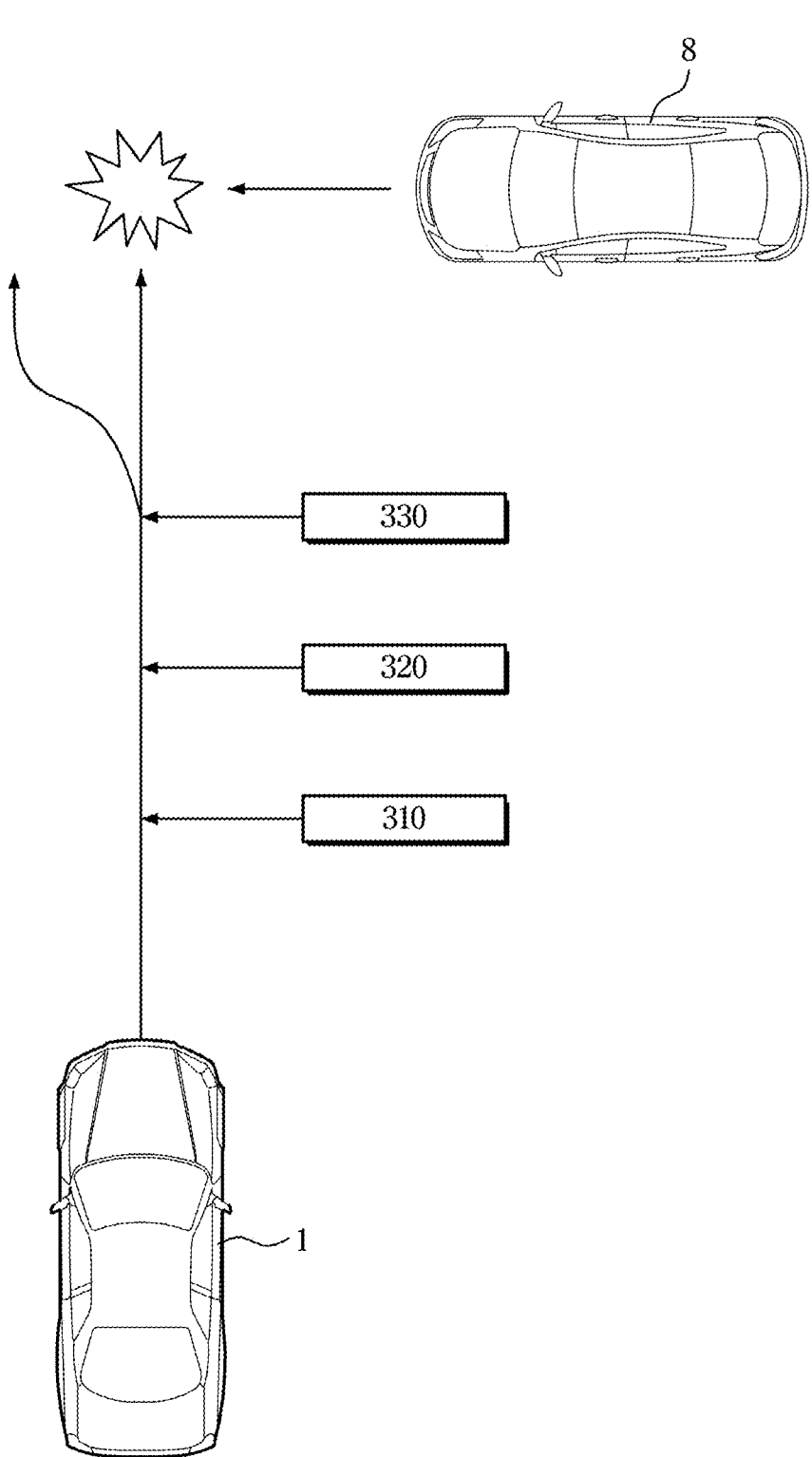
FIG. 9 and FIG. 10 are conceptual diagrams illustrating examples of a collision avoidance method according to various exemplary embodiments of the present invention.
Figure 10:
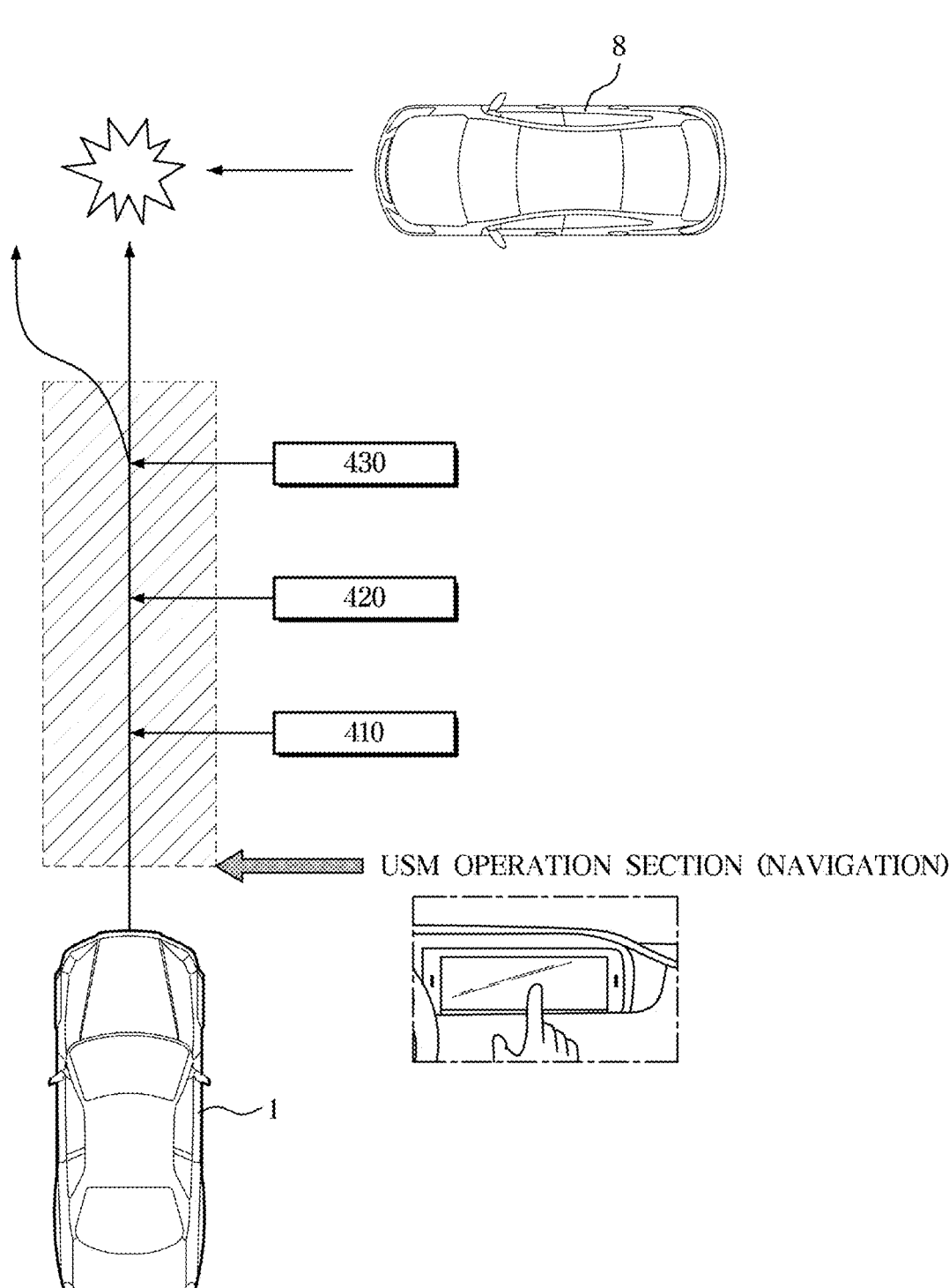

FIG. 9 and FIG. 10 are conceptual diagrams illustrating examples of a collision avoidance method according to various exemplary embodiments of the present invention.

When the driver normally drives the vehicle 1, if there is a predetermined risk of collision between the vehicle 1 and a peripheral vehicle 8, a method for controlling the vehicle 1 to avoid collision with the peripheral vehicle 8 will hereinafter be described with reference to FIG. 9.

Referring to FIG. 9, when the risk of collision with the peripheral vehicle 8 becomes higher while the vehicle 1 is driving at a constant speed of 60 km/h, the vehicle 1 may output the warning message for warning the driver of the high collision risk (Operation 310).

After outputting the collision risk warning message, the vehicle 1 may perform automatic braking control (Operation 320).

When steering avoidance is performed by the driver who controls the steering wheel, the vehicle 1 may perform steering assistance or automatic braking control (Operation 330).

If the risk of collision with the peripheral vehicle 8 becomes higher while the driver is handling the operating device 50 of the vehicle 1, a method for facilitating the vehicle 1 to avoid collision with the peripheral vehicle 8 will hereinafter be described with reference to FIG. 10.

Referring to FIG. 10, if it is determined that the driver is handling the USM while the vehicle 1 is driven at a constant speed of 60 km/h, the vehicle 1 may determine the dangerous state and the collision risk. The vehicle 1 may determine a warning output time point for outputting the warning message based on the determined dangerous state and the determined collision risk (Operation 410).

In more detail, when the driver is operating the USM using only one hand, the vehicle 1 may determine the complexity of a selection menu displayed on the USM, and may determine the collision risk level based on the complexity of the selected menu.

Based on the fact that the driver has difficulty in acquiring the field of view (FOV) when the driver views a screen of the USM to operate the USM, the vehicle 1 may determine that the driver is unable to perform steering avoidance control or braking control.

Based on the dangerous state and the collision risk, the vehicle 1 may determine the warning output time point to be a time point earlier than the existing warning output time point within a predetermined time cycle, determining the automatic braking control time point based on the determined time point (Operation 420).

After outputting the warning message, if steering avoidance is performed by the driver who controls the steering wheel, the vehicle 1 may perform steering assistance, and may again change the automatic braking control time point to another (Operation 430).

In other words, since the vehicle 1 outputs the warning message for collision avoidance at a time point earlier than the existing warning output time point, a sufficient avoidance response time for the driver may be guaranteed. As a result, the vehicle 1 can induce the driver to more effectively perform collision avoidance.

The above-mentioned embodiments may be implemented in a form of a recording medium storing commands configured for being executed by a computer system. The commands may be stored in a form of program code. When the commands are executed by the processor, a program module is generated by the commands so that the operations of the disclosed exemplary embodiments may be conducted. The recording medium may be implemented as a computer-readable recording medium.

The computer-readable recording medium includes all kinds of recording media storing data readable by a computer system. Examples of the computer-readable recording medium include a Read Only Memory (ROM), a Random Access Memory (RAM), a magnetic tape, a magnetic disk, a flash memory, an optical data storage device, etc.

As is apparent from the above description, the vehicle and a method for controlling the same can effectively implement collision avoidance performance by determining a collision avoidance method according to the driver's collision response ability.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A vehicle of performing collision avoidance control, the vehicle comprising:

a steering device;

a brake device;

an output device; and a controller electrically connected to the steering device, the brake device, and the output device and configured to:

determine an operating device being operated by a driver of the vehicle;

when there is a risk of collision between the vehicle and an external object, determine a dangerous state and a dangerous level according to signals received from the operating device being operated by the driver of the vehicle;

determine a collision avoidance method, a collision avoidance time point, and a control amount for collision avoidance, according to at least one of the determined dangerous state and the determined dangerous level; and control at least one of the steering device, the brake device, and the output device so that the vehicle is configured to perform the collision avoidance control, according to the determined collision avoidance method, the determined collision avoidance time point, and the determined control amount for the collision avoidance, wherein the controller is further configured to:

determine current positions of hands of the driver according to signals received from the operating device being operated by the driver;

determine a distance between the current positions of the hands of the driver and the operating device including a steering wheel operated by the driver; and determine the dangerous state and the dangerous level according to a magnitude of the determined distance between the current positions of the hands of the driver and the operating device operated by the driver and the determined operating device being operated by the driver, and wherein the controller is further configured to determine the dangerous state and the dangerous level in stages based on the magnitude of the distance between the current positions of hands of the driver and the operating device, and the determined operating device being operated by the driver, and wherein the controller is further configured to determine the dangerous state and the dangerous level based on a number of physical manipulation stages of the operating device, a complexity of physical manipulation stages, a long-pressing finger action required to operate the operating device, and an action for applying physical force of the driver.

2. The vehicle of claim 1, wherein the dangerous state includes at least one of a first state, in which guaranteeing a field of view (FOV) of the driver is impossible, a second state, in which operation of the steering wheel in the steering device by the driver is impossible, and a third state, in which depression of a brake pedal in the brake device by the driver is impossible.

3. The vehicle of claim 1, wherein the operating device includes at least one of the steering wheel, a gearshifting device, a rear-view mirror operating device, side-view mirrors, a window operating device, a User Setting Mode (USM) device, and a display device.

4. The vehicle of claim 1, wherein
when the controller concludes that the dangerous level is high, the controller is configured to determine the collision avoidance time point to be a time point within a predetermined time period; and
when the controller concludes that the dangerous level is high, the controller is configured to determine the control amount for the collision avoidance to be greater than a predetermined control amount for the collision avoidance.

5. The vehicle of claim 1, wherein the controller is configured to determine a distance between the driver and the operating device being operated by the driver.

6. The vehicle of claim 5, wherein when the controller concludes that the distance between the driver and the operating device being operated by the driver is longer than a predetermined distance, the controller is configured to determine that the dangerous level is high.

7. The vehicle of claim 5, wherein when the controller concludes that the distance between the driver and the operating device being operated by the driver is shorter than a predetermined distance, the controller is configured to determine that the dangerous level is low.

8. The vehicle of claim 1, wherein the controller is configured to determine the dangerous level, according to the number of the physical manipulation stages of the driver who is operating the operating device.

9. The vehicle of claim 1, wherein the controller is configured to determine the dangerous level, according to a number of menus displayed on the operating device being operated by the driver, a method for selecting the menus, and presence or absence of a scroll bar displayed on the operating device.

10. A method of controlling a vehicle for performing collision avoidance control,
the method comprising:
determining, by a controller, an operating device being operated by a driver of the vehicle;
when there is a risk of collision between the vehicle and an external object, determining, by the controller, a dangerous state and a dangerous level according to signals received from the operating device being operated by the driver of the vehicle;
determining, by the controller, a collision avoidance method, a collision avoidance time point, and a control amount for collision avoidance, according to at least one of the determined dangerous state and the determined dangerous level; and
controlling, by the controller, at least one of a steering device, a brake device, and an output device so that the vehicle is configured to perform the collision avoidance control according to the determined collision avoidance method, the determined collision avoidance time point, and the determined control amount for the collision avoidance,
wherein the determining the dangerous state and the dangerous level further comprises:
determining, by the controller, current positions of hands of the driver according to signals received from the operating device being operated by the driver;
determining, by the controller, a distance between the current positions of the hands of the driver and the operating device including a steering wheel operated by the driver; and
determining, by the controller, the dangerous state and the dangerous level according to a magnitude of the determined distance between the current positions of the hands of the driver and the operating device operated by the driver and the determined operating device being operated by the driver,
wherein the determining the dangerous state and the dangerous level further comprises determining the dangerous state and the dangerous level in stages based on the magnitude of the distance between the current positions of hands of the driver and the operating device, and the determined operating device being operated by the driver, and
wherein determining the dangerous state and the dangerous level is based on a number of physical manipulation stages of the operating device, a complexity of physical manipulation stages, a long-pressing finger action required to operate the operating device, and an action for applying physical force of the driver.

11. The method of claim 10, wherein the dangerous state includes at least one of a first state, in which guaranteeing a field of view (FOV) of the driver is impossible, a second state, in which operation of the steering wheel in the steering device by the driver is impossible, and a third state, in which depression of a brake pedal in the brake device by the driver is impossible.

12. The method of claim 10, wherein the operating device includes at least one of the steering wheel, a gearshifting device, a rear-view mirror operating device, side-view mirrors, a window operating device, a User Setting Mode (USM) device, and a display device.

13. The method of claim 10, further including:
when the controller concludes that the dangerous level is high, determining, by the controller, the collision avoidance time point to be a time point within a predetermined time period; and
when the controller concludes that the dangerous level is high, determining, by the controller, the control amount for the collision avoidance to be greater than a predetermined control amount for the collision avoidance.

14. The method of claim 10, further including:
determining, by the controller, a distance between the driver and the operating device being operated by the driver.

15. The method of claim 14, wherein
when the controller concludes that the distance between the driver and the operating device being operated by the driver is longer than a predetermined distance, determining, by the controller, that the dangerous level is high.

16. The method of claim 14, wherein
when the controller concludes that the distance between the driver and the operating device being operated by the driver is shorter than a predetermined distance, determining, by the controller, that the dangerous level is low.

17. The method of claim 10, further including:

determining, by the controller, the dangerous level, according to the number of the physical manipulation stages of the driver who is operating the operating device.

18. The method of claim 10, further including:

determining, by the controller, the dangerous level, according to a number of menus displayed on the operating device being operated by the driver, a method for selecting the menus, and presence or absence of a scroll bar displayed on the operating device.

* * * * *